United States Patent
Prokopenko et al.

(10) Patent No.: US 9,621,480 B2
(45) Date of Patent: Apr. 11, 2017

(54) DATA ACQUISITION PERTAINING TO CONNECTIVITY OF CLIENT APPLICATIONS OF A SERVICE PROVIDER NETWORK

(71) Applicant: Rawllin International Inc., Tortola (VG)

(72) Inventors: Anton Prokopenko, Saint-Petersburg (RU); Konstantin Malets, Saint-Petersburg (RU); Denis Kulikov, Saint-Petersburg (RU)

(73) Assignee: VIGO SOFTWARE LTD, Nicosia (CY)

( * ) Notice: Subject to any disclaimer, the term of this patent is extended or adjusted under 35 U.S.C. 154(b) by 296 days.

(21) Appl. No.: 13/784,228

(22) Filed: Mar. 4, 2013

(65) Prior Publication Data
US 2014/0250229 A1 Sep. 4, 2014

(51) Int. Cl.
G06F 15/16 (2006.01)
H04L 12/911 (2013.01)
(Continued)

(52) U.S. Cl.
CPC ............ *H04L 47/788* (2013.01); *H04L 29/06* (2013.01); *H04L 29/08072* (2013.01); *H04L 69/329* (2013.01)

(58) Field of Classification Search
CPC ....... H04L 12/56; H04L 29/06; H04L 69/239; H04W 12/06; H04W 48/18; H04W 80/00; H04W 88/16; H04W 92/00
(Continued)

(56) References Cited

U.S. PATENT DOCUMENTS 6,363,357 B1 * 3/2002 Rosenberg ............ G06Q 30/06
705/26.43
6,425,010 B1 7/2002 Alles et al.
(Continued)

FOREIGN PATENT DOCUMENTS

WO 01/89190 A2 11/2001

OTHER PUBLICATIONS

Altmann, "A Reference Model of Internet Service Provider Businesses", Accessed Nov. 13, 2013, 8 pages.
(Continued)

*Primary Examiner* — Khanh Dinh
(74) *Attorney, Agent, or Firm* — Amin, Turocy & Watson, LLP

(57) ABSTRACT

Providing for external control of data network client resources for application-based client network access is described herein. By way of example, the external control can be implemented by a third party service provider in conjunction with delivery of content to the client devices. The external control can be provided over a network gateway, for instance, and facilitate a proxy access to resource allocation components of the data network, or alternatively a direct communication access between the resource allocation components and third party service provider. The external control enables a content service provider to allocate resources on an as-needed basis to subsets of client devices requesting such content. Billing for data network resources as well as for service provider content can be reconciled among the respective networks and client according to a predetermined billing arrangement.

34 Claims, 9 Drawing Sheets

(51) Int. Cl.
*H04L 29/08* (2006.01)
*H04L 29/06* (2006.01)

(58) Field of Classification Search
USPC ...... 370/230, 252; 455/67.13, 445; 700/122; 707/609; 709/205, 217, 219, 223, 224, 709/226, 220; 717/100; 718/105; 726/3, 726/4, 5, 13
See application file for complete search history.

(56) References Cited

U.S. PATENT DOCUMENTS

| | | | |
|---|---|---|---|
| 6,449,739 | B1 | 9/2002 | Landan |
| 6,914,883 | B2 | 7/2005 | Dharanikota |
| 7,353,267 | B1 | 4/2008 | Cunningham et al. |
| 7,536,561 | B2 | 5/2009 | Warnock et al. |
| 7,602,723 | B2 | 10/2009 | Mandato et al. |
| 7,647,259 | B2 | 1/2010 | de Fabrega |
| 7,848,312 | B2 | 12/2010 | Zhang et al. |
| 7,895,297 | B2 | 2/2011 | Gorodyansky |
| 7,917,749 | B2 * | 3/2011 | Ginter ............... G06F 21/10 713/150 |
| 8,085,713 | B2 | 12/2011 | Kang |
| 8,111,618 | B2 | 2/2012 | Li et al. |
| 8,131,262 | B2 | 3/2012 | Trioano et al. |
| 8,145,263 | B2 | 3/2012 | van Rooyen |
| 8,191,117 | B2 | 5/2012 | Lapidous |
| 8,296,192 | B2 | 10/2012 | Bullock |
| 8,543,842 | B2 * | 9/2013 | Ginter ............... G06F 21/10 380/225 |
| 8,635,128 | B2 | 1/2014 | Fan et al. |
| 8,776,175 | B1 * | 7/2014 | Hermes .............. 726/3 |
| 8,793,305 | B2 | 7/2014 | Fiatal |
| 9,412,122 | B2 * | 8/2016 | Trauberg ............ G06Q 30/06 |
| 2001/0039497 | A1 | 11/2001 | Hubbard |
| 2002/0194251 | A1 * | 12/2002 | Richter et al. .......... 709/105 |
| 2003/0229588 | A1 | 12/2003 | Falk et al. |
| 2005/0022001 | A1 * | 1/2005 | Bahl et al. ............. 713/200 |
| 2006/0085478 | A1 | 4/2006 | Landau et al. |
| 2006/0195856 | A1 | 8/2006 | Solomon et al. |
| 2006/0259359 | A1 | 11/2006 | Gogel |
| 2008/0004978 | A1 * | 1/2008 | Rothschild ............ G06Q 30/00 705/26.8 |
| 2008/0016533 | A1 * | 1/2008 | Rothschild ............ H04N 7/17318 725/60 |
| 2009/0287764 | A1 | 11/2009 | Pazhyannur et al. |
| 2010/0107225 | A1 * | 4/2010 | Spencer et al. ........... 726/4 |
| 2010/0332615 | A1 * | 12/2010 | Short et al. ............. 709/217 |
| 2011/0145115 | A1 | 6/2011 | Kim et al. |
| 2011/0166918 | A1 | 7/2011 | Allaire et al. |
| 2011/0302017 | A1 | 12/2011 | Marti et al. |
| 2013/0080895 | A1 | 3/2013 | Rossman et al. |
| 2013/0254082 | A1 | 9/2013 | Zuber |

OTHER PUBLICATIONS

Turbo Internet Accelerator Features (New Version 2.1), published online, Accessed Nov. 13, 2013, 2 pages.
Wikipedia. "Freemium", published online at [http://en.wikipedia.org/wiki/Freemium], Accessed Nov. 13, 2013, 5 pages.
Wikipedia. "Free-to-play", published online at [http://en.wikipedia.org/wiki/Free-to-play], Accessed Nov. 13, 2013, 7 pages.
Wikipedia. "Spotify", published online, Accessed Nov. 13, 2013, 27 pages.
Weinberg, "Speed's Other Needs" published online at [http://techcrunch.com/2012/09/23/speeds-other-needs/], on Sep. 23, 2012, 3 pages.
Patentability Search Report; Data Acquisition Pertaining to Connectivity of Client Devices of Provider Network, and corresponding Availability/Utilization of Provider Network; Sep. 1, 2012, 11 pages.
Patentability Search Report; "A network service management system that provides fee-based network services, billing on a per-use basis for consumed network content"; Dec. 12, 2012; 10 pages.
Office Action dated Jul. 20, 2015 for U.S. Appl. No. 13/917,232, 45 Pages.
Office Action dated Mar. 18, 2016 for U.S. Appl. No. 13/917,232, 35 pages.
Office Action dated Jul. 14, 2016 for U.S. Appl. No. 14/067,458, 43 pages.
Office Action dated Nov. 16, 2015 for U.S. Appl. No. 13/917,232, 19 pages.
Office Action dated Nov. 1, 2016 for U.S. Appl. No. 14/067,458, 18 pages.
Notice of Allowance dated Sep. 19, 2016 for U.S. Appl. No. 13/917,232, 18 pages.

* cited by examiner

DATA ACQUISITION PERTAINING TO CONNECTIVITY OF CLIENT APPLICATIONS OF A SERVICE PROVIDER NETWORK

TECHNICAL FIELD

The subject disclosure refers generally to provision of media content over a network, e.g., data acquisition for client devices of a service provider network.

BACKGROUND

Advancements in high-speed last mile access to the Internet have enabled consumers to greatly expand the scope and diversity of content they can receive through electronic communications. Likewise, advancements in network storage space, such as cloud storage in one example, and multiple access server technology has enabled multimedia service providers to store and distribute larger and more diverse content. Such content can include media, multimedia, text, graphics, and so on. Network-stored media in particular is becoming very popular, ranging from relatively small audio content like songs and ringtones, to larger podcasts, full length movies, and even much larger audio-video content. It is not hyperbole to say, therefore, that fixed electronic communication systems have become a backbone of industrial, commercial and personal communications worldwide. Likewise, mobile communication networks have provided voice and data communication functionality that have become near-ubiquitous for both business and personal communications throughout much of the world. Content-related communication, for audio/video entertainment, single player and multiplayer online games, and the like, has also become popular, utilizing the fundamental architecture of the Internet and associated webs or networks as the underlying data/content communication platform.

Content and service providers generally employ multi-access servers to handle client communication or content requests, provide encryption or other security, and to track usage for billing content and services consumed by client devices. For high data applications and related content archiving, large capacity data storage devices are often utilized and configured to store this content, and in conjunction with the multi-access servers, permit access to subsets of the stored content. Common modern examples of online content or services include multimedia content such as movies, episode-based television content such as sitcoms, news programs, and other audio/video content, as well as audio content, and even real time interactive audio/video content, single-player or multiplayer games, as well as communication services, blogs, online forums, e-mail, text messaging, multimedia messaging, and so on.

A popular interface between the service provider and the consumer is a subscriber account. A consumer provides identification information and establishes login credentials for purposes of identifying themselves and restricting access to the subscriber account. Upon authorizing access to a subscriber account, selected content or services requested via a client device logged in to the subscriber account can be delivered over a network for consumption. This framework enables content providers to track the usage of a particular subscriber, to facilitate billing the account for content and services consumed via the account.

In addition, the subscriber account can store information or choices about content services, content delivery services or the content itself, client device information, and so on, via the subscriber account. Thus, different levels of service can be established for different subscribers, and different billing rates established for different levels of service, all stored at the subscriber account. This enables network content providers to provide a range of billing rates and therefore accommodate a range of costs for a population of consumers. It also enables content providers to distribute specialized services or features for a subset of consumers who are interested in those services or features. Thus, the subscriber account facilitates a great deal of diversity in online content services.

Because network multimedia content is managed via client-server communications over a network, client authorization and user verification procedures are employed to control client access to content. A server might, for instance, be provisioned to check that a client device is associated with a subscription account offered by a particular content provider. This allows a service provider to limit content delivery to those users who have an agreement with the service provider, as well as protect intellectual property rights of content owners. As technology associated with consumer playback devices and network access infrastructure changes, providers typically adapt their services to achieve new possibilities made available by these technological changes. This evolution in technology is ongoing, and generates seemingly perpetual demand to expand upon or improve existing content or services to match these changes, and is one of many current challenges related to online multimedia content delivery.

SUMMARY

The following description and the annexed drawings set forth in detail certain illustrative aspects of the disclosed subject matter. These aspects are indicative, however, of but a few of the various ways, or embodiments, in which the principles of the disclosed subject matter may be implemented. The disclosed subject matter is intended to include all such embodiments and their equivalents. Other advantages and distinctive features of the disclosed subject matter will become apparent from the following detailed description of the various embodiments when considered in conjunction with the drawings.

Various aspects of the subject disclosure provide for external control of network resources for client devices of a network service provider. The external control can be implemented in conjunction with delivery of content to the client devices and applications operating on the client devices. In particular aspects, the external control can be provided to a third party service provider of the content, enabling the service provider to allocate resources on an as-needed basis to subsets of client devices requesting such content.

In a particular aspect, external control of network resources can be implemented in conjunction with multiple content-related Internet communication models. One communication model can include a preview-limited communication model. The preview-limited communication model can include limited Internet access by an Internet Service Provider (ISP) for client devices. The preview-limited model can be provided at reduced or no cost. The limited access can include, for instance, previewing service provider(s) content, previewing service provider(s) services, or the like. A content or service consumption model can include greater or full access to one or more Internet service providers. Utilizing this model, a client can access and consume content or services. This model can be billed at a subscriber rate. The subscriber rate can bill delivery services (e.g., ISP costs) separately from content provider services, or in some combined arrangement.

According to one or more further aspects of the subject disclosure, network service provider resources can be monitored to track consumption of those resources in real time. Real-time availability/consumption of network resources can be exported to an entity external to the network service provider network. Instructions for allocating, de-allocating, modifying, etc., network resources can be generated external to the network service provider's network and implemented with the network. In one aspect, direct access to network resource controls can be exported to the external entity. In other aspects, the network service provider network can include proxy services that receive instructions related to real-time network resource control for client devices, and implement those instructions.

In at least one aspect, consumption of network resources directed by an external entity can be monitored separate from other network resources allocated internally by a service provider's network. Externally directed network resource consumption can be compiled and parsed as a function of one or more suitable parameters, including identity of external entity, amount or type of resources consumed, quality of service (QoS) resources, impact of such resource consumption (e.g., percent of available network resources consumed, resulting congestion, . . . ), or the like, or a suitable combination thereof. The compilation and parsing of externally directed network resources can be used in part for billing calculations or remediation related to consumption of content and delivery of such content by a client device.

In further aspects, multiple service provider networks can be integrated as delivery resources for content consumed by client devices. Control over such delivery resources can be externally directed, by one or more providers of the content. In such case, real-time availability of resources can be managed and leveraged as directed by the one or more content providers. In a particular aspect, a service provider network can be entirely allocated to external control. In other aspects, a subset of resources can be allocated to external control. In yet other aspects, a combination of the foregoing can be implemented, where some networks are fully allocated to external control and other networks are partially or conditionally allocated to external control. Suitable conditions can include allocation up to a subset of total resources, allocation at particular times, different subsets of resources at different times, or the like, or suitable combinations thereof.

The following description and the annexed drawings set forth in detail certain illustrative aspects of the disclosed subject matter. These aspects are indicative, however, of but a few of the various ways in which the principles of the disclosed subject matter can be employed and the disclosed subject matter is intended to include all such aspects and their equivalents. Other advantages and novel features of the disclosed subject matter will become apparent from the following detailed description when considered in conjunction with the drawings.

DETAILED DESCRIPTION

Figure 1:
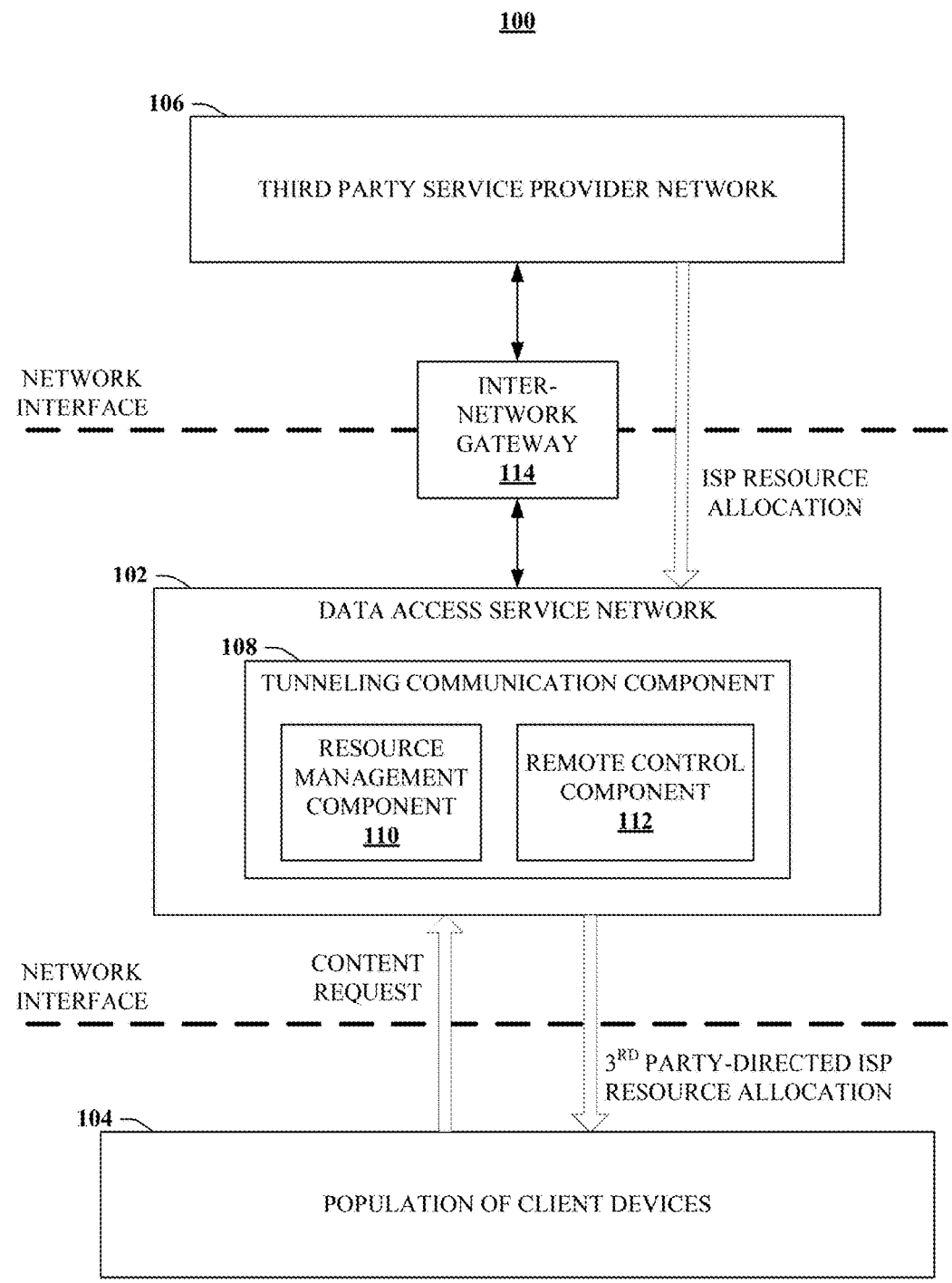
FIG. 1 depicts a block diagram of a sample system facilitating external control of network resources for content delivery to a client, in various disclosed aspects.

The disclosed subject matter is described with reference to the drawings, wherein like reference numerals are used to refer to like elements throughout the description. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram or schematic form in order to facilitate describing various aspects disclosed herein.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "module", "interface," "user interface", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

Since the advent of network-based computer services, challenges involved in delivering network services to a dynamic population of client devices have been a driving motive for the multiple-access server system. Such a system enables a population of client devices to request access to services independent from the server and independent from other client devices. Moreover, the server can allocate resources to facilitate network services for a particular client device independent of other client devices.

Though the basic problem of serving a dynamic population of client devices is well served by the multiple-access server system, many secondary challenges still remain. For instance, maximizing resource utilization for a dynamic population of client devices can be beneficial, yet difficult to achieve in practice. Moreover, serving high densities of client devices while avoiding service degradation can be a particularly challenging problem.

In various aspects of the subject disclosure, provided is an integrated network communication model that is content-centric, and interfaces client device applications with content service providers over a network. Network service provider (e.g., Internet service provider [ISP]) network resources can be allocated to service providers, which in turn utilize subsets of the resources in delivering network-based media content or services content (referred to herein in the aggregate as content) to client devices. Billing for such a system can be integrated in some aspects, where ISP network charges are bundled with the cost of accessing and consuming content, or can be separate. In particular aspects, service providers can be given external control over some internal resources of an ISPs network in conjunction with employing the ISP network to deliver content to an application operating on a client device. This enables the service provider to provide adequate bandwidth, quality of service (QoS), bitrates, and so on, suitable for delivery and consumption of a particular class of content (e.g., high definition video content, audio content, web-browsing content, social media messaging content, . . . ), or suitable to match playback/operating capabilities of the application, and so forth, or suitable combinations thereof. This arrangement also opens up a mechanism to move away from the traditional client-ISP arrangement in which client device users pay for network access via a network service provider, and then access content provider networks on the Internet, or the like. Rather, a client—content service provider interaction can be implemented with the network service provider serving the content service provider.

Referring now to the drawings, FIG. 1 illustrates a block diagram of an example system 100 that facilitates external control of data access network resources in conjunction with delivering content to a client device, in various aspects of the subject disclosure. System 100 can be implemented in conjunction with a wide area access network (e.g., the Internet, an intranet, . . . ) that includes or is connected to an external or third party online content provider. As utilized herein, online content can include media (e.g., text, graphics, metadata, audio data, video data, . . . ), multimedia (e.g., high definition audio-video plus metadata, . . . ), services (e.g., social media website, social feed application, news feed application, web-based shopping, . . . ), or the like, or a suitable combination thereof, obtained at least in part over the wide area data network.

System 100 can comprise a data access service network 102 that facilitates access to a wide area data network for a population of client devices 104. Data access service network 102 can include an ISP network, a terrestrial radio access network (TRAN—also referred to more simply as a RAN), a mobile network, a local area network, a wide area network, or the like, or a suitable combination of the foregoing. In some disclosed aspects, the wide area data network to which data access service network 102 facilitates access is the Internet. In other aspects, the wide area data network can be a private intranet, or a suitable combination of a public and private network(s). Data access service network 102 communicates with population of client devices over a suitable network interface(s). A particular implementation of the network interface can depend on transceiver equipment and communication protocols of population of client devices 104 and data access service network 102. For instance, for a wired transceiver, network interface could include an IEEE interface, an optical fiber network interface, a USB interface, a twisted-pair interface, a shielded coaxial cable interface, and so on, operating under suitable communication protocols. Likewise, in the event that population of client devices 104 or data access service network 102 employs a wireless transceiver, the network interface could include a radio frequency bearer, a microwave frequency bearer, and so forth.

Further to the above, system 100 can comprise one or more third party service provider networks 106 communicatively connected to data access service network 102 via an inter-network gateway 114. It should be appreciated that communicative connections between third party service provider network 106 and data access service network 102, as well as between data access service network 102 and population of client devices 104, can be direct connections or indirect connections (e.g., through one or more intermediary networks, devices, or entities, such as inter-network gateway 114).

Data access service network can further comprise a tunneling communication component 108. Tunneling communication component 108 can be configured to facilitate control of a finite amount of network resources to third party service provider network 106. Particularly, the finite amount of network resources can comprise resources that facilitate communication between data access service network 102 and one or more of population of client devices 104. Accordingly, tunneling communication component 108 can be configured to facilitate external control of allocation, de-allocation, or modification of communication resources of data access service network 102. The finite amount of network resources can comprise all network resources of data access service network 102, or a subset of such network resources. In addition, external control of the finite amount of network resources can be conditional, based on conditions managed by tunneling communication component, absolute (e.g., non-changing), quasi-absolute (e.g., non-changing subject to deactivation), or the like. Moreover, tunneling communication component 108 can be configured to activate the external control of the finite amount of network resources—thereby enabling the control—or to deactivate the external control—thereby terminating the control.

Tunneling communication component 108 can comprise a resource management component 110, in particular aspects of the subject disclosure. Resource management component 110 can be configured to track and compile network resources exported for control by third party service provider network 106 over inter-network gateway 114. These network resources can include bandwidth(s), data rate(s), quality of service (QoS), or the like, or a suitable combination thereof. Further, these network resources can be compiled and parsed by resource management component 110 as a function of an identity of third party service provider network 106, an amount of the resources consumed, a type of the resources consumed, or an impact metric of the resources consumed (e.g., percent of available network resources consumed, resulting congestion, . . . ), or the like, or a suitable combination thereof. Network resource information can be compiled by resource management component 110 in a real-time fashion, updating consumption totals in response to periodic resource consumption data from components (not depicted) of data access service network 102 or changes therein. In at least one aspect of the subject disclosure, compiled network resource information—or suitable subsets thereof—can be exported to third party service provider network 106 to facilitate a resource consumption feedback input in conjunction with a real-time control of network resources of data access service network 102.

Further to the above, tunneling communication component 108 can comprise a remote control component configured to facilitate allocation of a subset of the communication resources of data access service network 102, to third party service provider's network 106. Remote control component 112 can facilitate allocation, de-allocation, etc., of the network resources in response to instructions received from third party service provider's network via inter-network gateway 114. In at least one aspect of the subject disclosure, remote control component 112 can serve as a proxy for implementing resource allocation instructions originated at third party service provider's network 106. In this aspect(s), remote control component 112 receives such commands, and implements the resource allocation instructions within data access service network 102. The implementation can be subject to one or more rules governing the relationship between data access service network 102 and third party service provider network 106, in a particular aspect (e.g., see FIG. 2, infra). In other aspects, remote control component 112 can establish a secure communication link between third party service provider network 106 and resource allocation components (not depicted) of data access service network 102. In this case, the resource allocation instructions can be implemented directly by data access service network 102 on the condition that third party service provider network 106 is properly authorized on the secure communication link, and on the condition that the instructions are consistent with predetermined rules for remote resource control.

As depicted, system 100 can facilitate direct interaction between a user of one or more of population of client devices 104 and third party service provider network 106. This can provide a change in the traditional Internet service model, for instance, where a user interfaces with an ISP or mobile network provider to access the Internet, and then interacts with a service provider once access to the Internet is obtained. System 100 can instead facilitate direct access between population of client devices 104 and third party service provider network 106, where the third party service provider controls resource allocation to client devices 104, rather than an agreement between client devices and the ISP. In this context, multiple communication models—as viewed from the client device—can be implemented to serve different browsing activities of client devices. In addition, different billing models can be employed that make sense with the different communication models and browsing activities. Examples of such communication models are described in more detail in FIG. 2 and other aspects throughout the subject disclosure.

Figure 2:
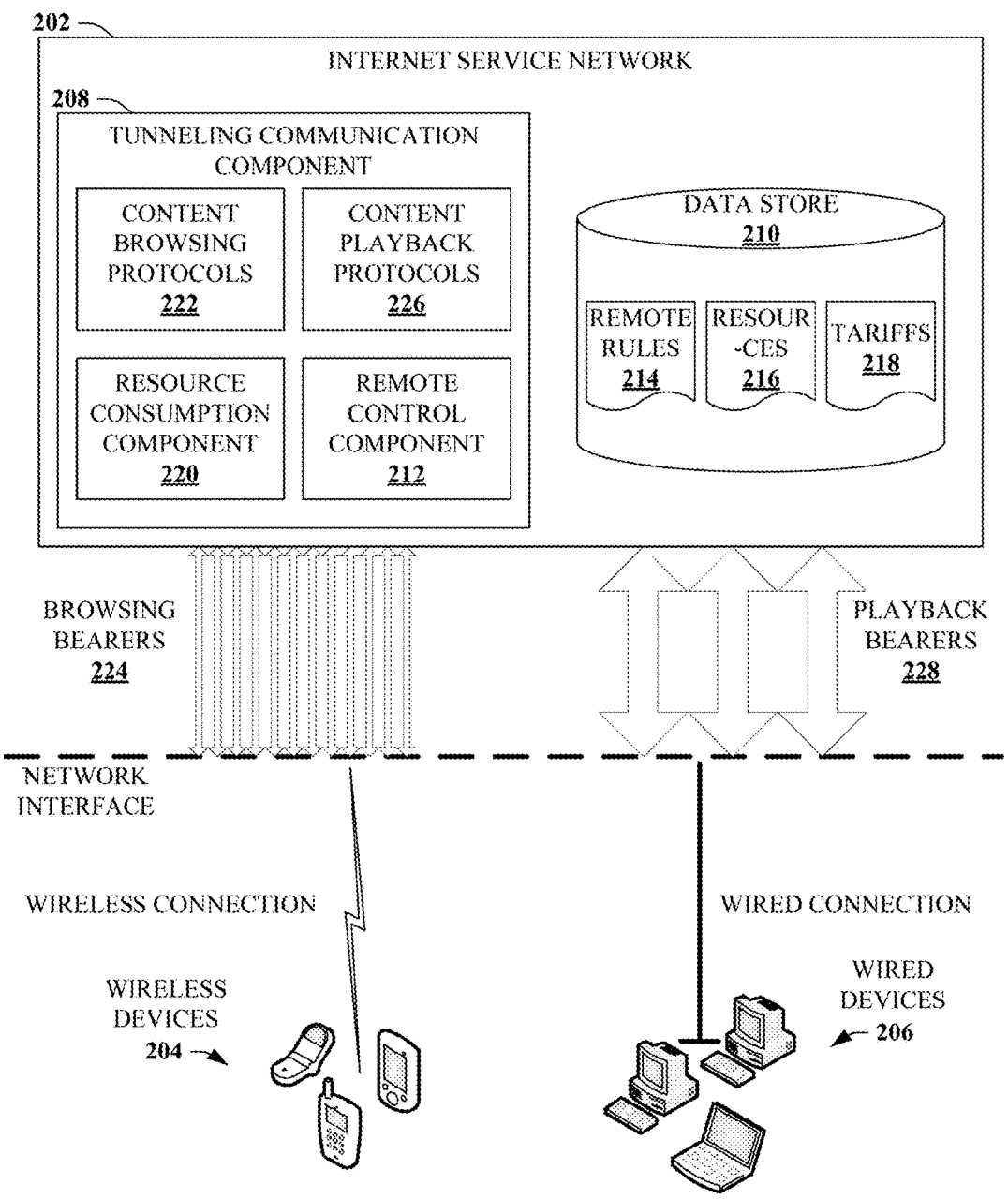
FIG. 2 illustrates a block diagram of an example system for providing content preview access and content consumption access for wireless communications.

FIG. 2 illustrates a block diagram of an example system 200 that facilitates content-dependent network access in conjunction with online content delivery according to one or more additional aspects of the subject disclosure. System 200 can comprise an Internet service network (e.g., an ISP network) communicatively connected to client devices over a network interface. Client devices can include wireless devices 204 connected to Internet service network 202 over a wireless network interface. Alternatively, or in addition, client devices can include wired devices 206 connected to Internet service network 202 over a wired network interface. Wired and wireless communication capacity of Internet service network 202 is supported by a finite set of network resources, which can include communication bandwidth, data rates, QoS, and so forth.

Internet service network 202 can comprise or can be connected to a tunneling communication component 208 configured to provide control over a subset of the finite set of network resources to an entity external to Internet service network 202. The control over the subset of network resources can be governed by tunneling communication component 208 according to a set of rules stored in a data store 210 managed by a remote control component 212. Rules can include, for example, a set of remote control rules stored in remote rules file 214, resource rules stored in a resources file 216, and tariffs and billing rules stored in a tariffs file 218. It should be appreciated that rules for governing the external control of network resources can be divided into other categories or subsets of rules, in additional aspects of the subject disclosure.

Remote control rules can govern what external entities are authorized to access network resources of Internet service network 202, how to identify an external entity (e.g., Internet Protocol [IP] address, entity identifier code, . . . ), how to authorize such an entity (e.g., password, digital certificate, approved IP address, . . . ), how to communicate with such an entity, and how to receive and implement resource allocation commands by such an entity (e.g., via proxy, by providing direct access to resource allocation components of Internet service network 202, and so forth). Resource rules can govern what resources can be controlled by an external entity (e.g., bandwidth, data rate, type of communication bearer, QoS, . . . ), an amount or type of such resources to be exported to an external entity or set of such entities, and resources to allocate to respective ones of the set of such entities. Tariffs and billing rules can govern the costs of network resources allocated to an external entity, and how to allocate the costs to the external entity(ies).

To facilitate remote control of network resources, a resource consumption component 220 can track allocation or consumption of network resources of Internet service network 202. In some aspects, resource allocation or consumption can be exported in real-time to external entities as a feedback mechanism to facilitate optimizing an amount of resources for a particular type of content delivery (e.g., high definition audio-video, audio, web-browsing, . . . ) to client devices 204, 206. Resource allocation or consumption can further be tracked to determine a suitable cost or billing amount for the network resources controlled by an external entity in conjunction with facilitating network access for client devices 204, 206.

Further to the above, tunneling communication component 208 can facilitate a plurality of communication models between Internet service network 202 and client devices 204, 206. As one example, the plurality of communication models can comprise a preview-only communication model facilitating limited data network access (e.g., Internet access, . . . ). The limited data network access can include, for instance, limited Internet access to one or more domains, host computers, websites, etc., on the Internet. The limited data network access can further be limited to previewing information indicative of content or services of a third party service provider, as one example. The preview-only communication model can be offered to client devices 204, 206 at a reduced fee or at no cost, whereas tariffs for the preview-only communication model can be a predetermined rate billed to an external third party service provider.

In a particular implementation, the preview-only communication model can be implemented via one or more browsing bearers 224. The browsing bearers 224 can be implemented by tunneling communication component 208 based on a set of content browsing protocols 222. Further, the browsing bearers 224 can be established in response to activation of a preview-only application at client devices 204, 206, or a request for a browsing bearer 224 by an external third party service provider. Indication of this activation of the preview-only application can be transmitted directly to Internet service network 202 from client devices 204, 206, or can be transmitted through Internet service network 202 to the external third party service provider, which in turn can send a request for a browsing bearer 224 to Internet service network 202. Browsing bearers 224 can be implemented with a low amount of network resources to facilitate low-throughput preview-only browsing. A low amount of network resources can include a limited bandwidth (e.g., 64 kilobytes [kB] per second, 128 kB per second, 256 kB per second, . . . ), a low QoS, a low datarate, access at non-peak times, or the like, or a suitable combination thereof. Once a content selection is made at client devices 204, 206 (e.g., through a preview-only communication model), playback or consumption of data related to multimedia, network services, etc., associated with the selected content can be implemented for client devices 204, 206.

As a further example, the plurality of communication models can include a content consumption model facilitating a network communication with a higher allocation of network resources than the preview-only communication model. The content consumption model can be facilitated by tunneling communication component 208 utilizing content playback protocols 226 suitable for establishing one or more playback bearers 228 for client devices 204, 206 having activated content playback or consumption from a third party service provider associated with Internet service network 202. The playback bearers 228 can be configured to support high data content services (e.g., high definition online audio-video content, . . . ), high datarate services (e.g., for online gaming, . . . ) or the like.

In at least some aspects of the subject disclosure, content browsing protocols 222 or content playback protocols 226 can be configured to allocate a static and fixed set of network resources for a particular bearer (e.g., one set of resources for a browsing bearer 224 and a second set of resources for a playback bearer 228), or one set of network resources from a group of such resource sets that are pre-allocated to a particular bearer, or to a particular type of content on such bearer (where client devices 204, 206 or an external third party service provider can specify the particular type of content, or where tunneling communication component 208 can be configured to mine data packets transmitted through Internet service network 202 to extract the type of content contained therein). In at least one alternative aspect, content browsing protocols 222 or content playback protocols 226 can be configured to facilitate dynamic network resource allocation by an external third party service provider, optionally with one or more resource limitations imposed by remote control component 212 based on remote rules 214 or resources rules 216 (or tariff rules 218, where applicable). The dynamic allocation of network resources can then be configured to provide suitable resources to support existing content delivery to client devices 204, 206, subject to the rules 214, 216, 218, and subject to total network resources or any subset of resources allocated to the external third party service provider.

Figure 3:
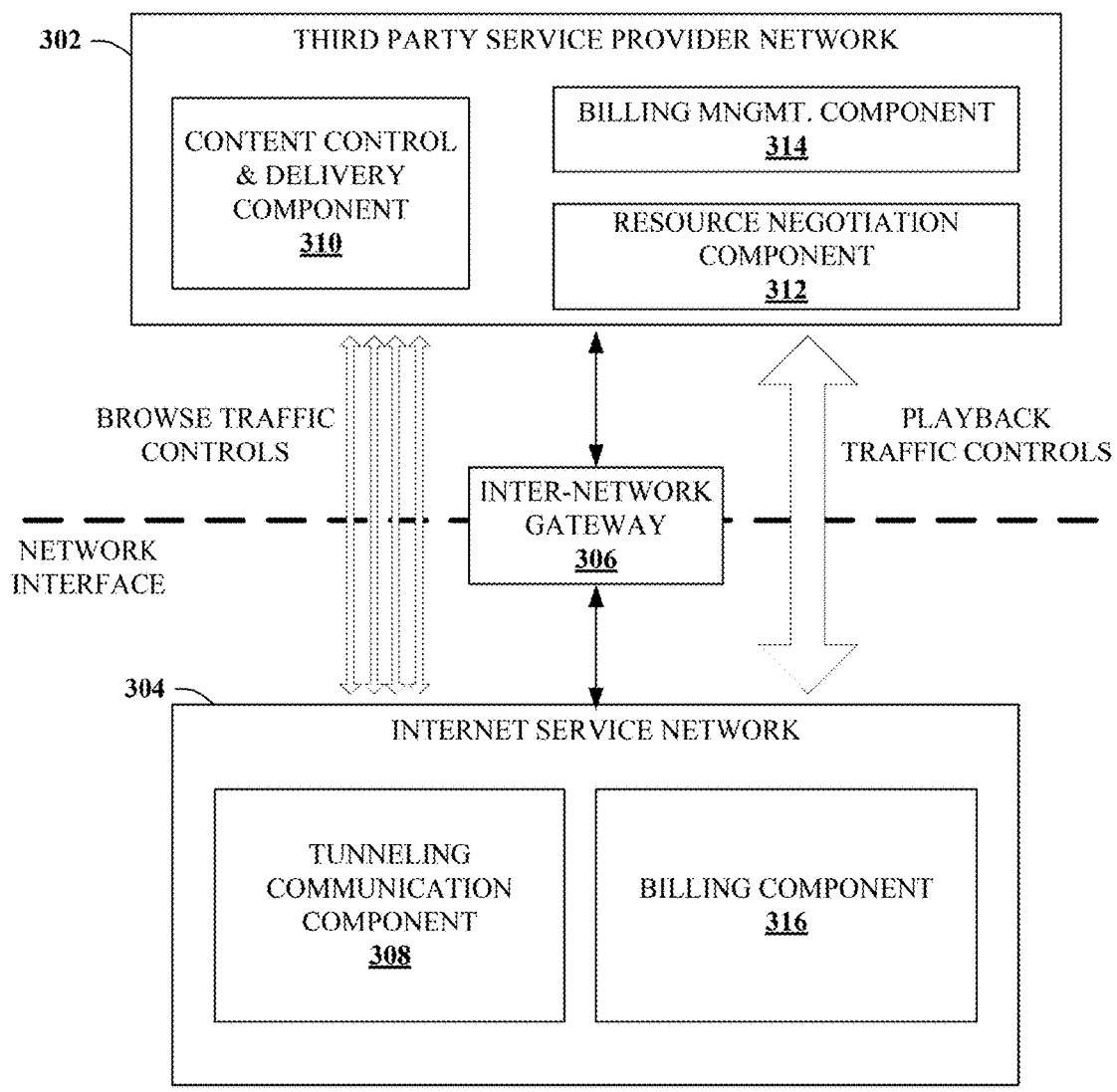
FIG. 3 depicts a block diagram of a sample system that facilitates disparate Internet access models related to content delivery according to other aspects.

FIG. 3 illustrates a block diagram of a sample system 300 facilitating external control of ISP network resources and coordinate billing services for disparate networks, according to one or more further aspects of the subject disclosure. System 300 can comprise an Internet service network 304 communicatively connected to a third party service provider network 302 over an inter-network gateway 306. Internet service network 304 can comprise an ISP, a local area network, a wide area network, an intranet, a web, or other suitable network that provides or has a connection to the worldwide web or other suitable wide area network. Inter-network gateway 306 can be a component of Internet service network 304 or of third party service provider network 302, or can be external to both networks.

Internet service network 304 can comprise a tunneling communication component 308 configured to export controls over at least a subset of network resources of Internet service network 304. The subset of network resources can comprise network resources for communicating with client devices of Internet service network 304 (e.g., see FIG. 1 or 2, supra). A content control and delivery component 310 of third party service provider network 302 can be configured to communicate with the client devices utilizing the subset of network resources. Disparate types of content can be delivered to the client devices utilizing respective traffic channels, which can be configured with respective suitable allocations of the subset of network resources. A resource negotiation component 312 can store predetermined sets of resources to be allocated for delivery of respective types of content. As an example, a first set of resources can be associated with a first type of content, a second set of resources associated with a second type of content, and so on. Resource negotiation component 312 can manage allocation of sets of resources in response to requests of a particular type of content from a client device. Further, resource negotiation component 312 can manage allocation of sets of resources within constraints determined by the subset of network resources allocated to third party service provider network, as well as within constraints established by Internet service network (e.g., rules 214, 216, 218 of FIG. 2, supra).

Third party service provider network 302 can further comprise a billing management component 314 for tracking content consumed by the client devices. Costs for consumed content can be charged to subscriber accounts of respective client devices consuming respective portions of the content. Likewise, a billing component 316 of Internet service network can track an amount, type, impact, etc., of the subset of network resources of Internet service network 304 consumed in conjunction with delivery of the content to the client devices. Moreover, billing component 316 can comprise rules for allocating costs associated with consumed resources of the subset of network resources. The rules for allocating these costs can be implemented in various fashions. As one example, Internet service network 304 can bill third party service provider network 302, which can pass these costs on to respective client device subscriber accounts. In another example, costs of Internet service network 304 can be billed directly to the client device subscriber accounts separate from charges billed by third party service provider network 302. In yet another example, charges billed by third party service provider network 302 can be provided to billing component 316 of Internet service network 304 for charging to client device subscriber accounts. It should be appreciated that other billing arrangements for charges of third party service provider network 302 and Internet service network 304 can be implemented by system 300. Such arrangements can comprise separate billing by respective networks, or can comprise integrated billing where one of the networks (or a third billing network) charges client device subscriber accounts. In addition, other arrangements known in the art or made known to one of skill in the art by way of the context provided herein, or suitable combinations of the foregoing, are considered within the scope of the subject disclosure.

Figure 4:
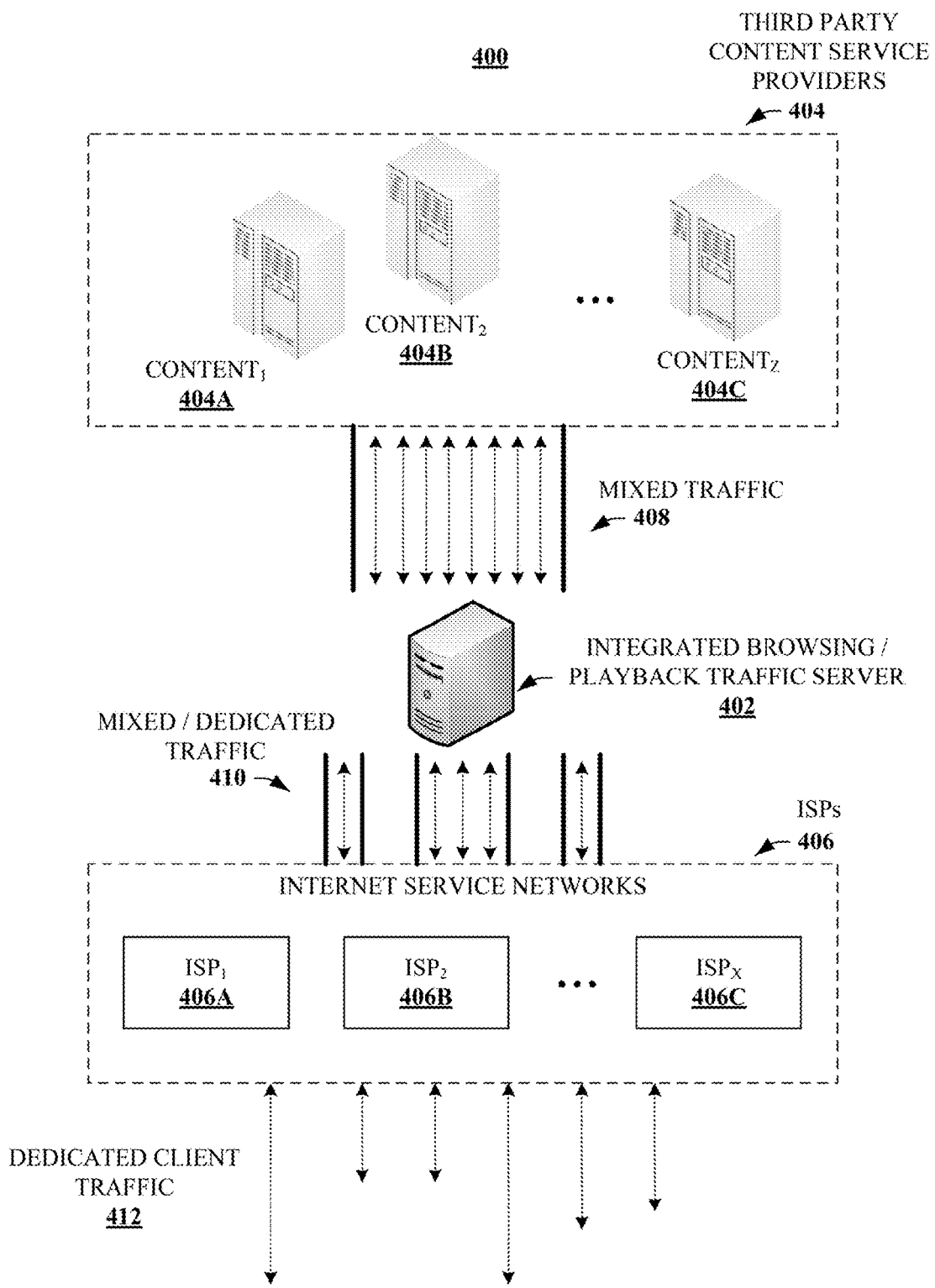
FIG. 4 illustrates a block diagram of an example system that facilitates external resource control for multiple network or content providers, in yet other aspects.

FIG. 4 depicts a block diagram of an example system 400 for providing online content delivery according to further aspects of the subject disclosure. System 400 can comprise an integrated browsing/playback traffic server 402 configured to provide an interface between multiple ISP networks 406 (including $ISP_1$ 406A, $ISP_2$ 406B, $ISP_X$ 406C; referred to collectively as ISPs 406A-406C) or multiple third party content servers 404 (including content server$_1$ 404A, content server$_2$ 404B, content server$_Z$ 404C; referred to collectively as content servers 404A-404C) for access and delivery of content to client devices of ISP networks 406. Third party content servers 404 can include Internet content providers maintaining a website, for instance. Examples of Internet content providers can include online shopping websites (e.g., Amazon.com®, Ebay.com, Overstock.com®, . . . ), social media websites (e.g., Facebook®, Twitter®, LinkedIn®, . . . ), online media and multimedia content websites (e.g., streaming radio, streaming audio, streaming video, streaming movies, downloadable audio-video, and so on), electronic communication websites (e.g., e-mail, instant message, text message, . . . ), news media websites (e.g., DrudgeReport.com, . . . ), online gaming websites (e.g., Kongregate®; Gamezhero.com, Dungeoneers®, . . . ), online advertisement services, or other online content or service applications and sites, or suitable combinations thereof.

Integrated browsing/playback traffic server 402 can further integrate with multiple ISP networks 406, and manage respective subsets of network resources of the respective ISP networks 406. In some aspects, integrated browsing/playback traffic server 402 can be configured to aggregate respective subsets of network resources, and export control over subsets of the aggregated resources to respective ones of third party content servers 404. Third party content servers 404 can utilize these subsets of the aggregated resources to delivery content to client devices of one or more of ISP networks 406. Further, third party content servers 404 can be configured to control allocation of the subset(s) of aggregated resources to respective client devices. Control of resource allocation can be real-time, facilitating increase or decrease or ISP network 406 resources to serve transient demand of the client devices, in some aspects. In other aspects, third party content servers 404 can provide predetermined resource allocations based on a communication model (e.g., preview-only model, content playback model, . . . ) or type of content requested by a client device, or the like. In yet other aspects, a suitable combination of the foregoing modes of resource allocation can be established by third party content servers 404, via integrated browsing/playback traffic server 402.

Integrated browsing/playback traffic server 402 can receive aggregated or mixed traffic 408 from third party content servers 404. The mixed traffic 408 can represent combined communications of respective third party traffic servers 404, with content delivered by one of the servers to a group of client devices, for instance, in one communication band (e.g., within sub-bands of a single band, or the like) or a set of communication bands. Combined communications of third party content servers 404 are received at integrated browsing/playback traffic server 402, and directed to respective ISP networks 406 whose network resources are employed in delivering respective content to respective client devices. Thus, integrated browsing/playback traffic server 402 can transmit mixed/dedicated traffic 410, comprising separated streams of communication for disparate client devices for some ISP networks 406, and an aggregate of some or all client communications for other ISP networks 406, depending on configurations of respective ISP networks 406. The ISP networks 406 can then separate any remaining mixed traffic to deliver dedicated client traffic 412 to respective client devices.

In general, system 400 illustrates an example arrangement in which resources of multiple ISP networks 406 can be exported for control by one or more third party content servers 404. Resources can be aggregated by an integrated entity (e.g., integrated browsing/playback traffic server 402) so that third party content servers 402 can treat the resources as a single block, without respect to which resources belong to which ISP network 406. Suitable translation of subsets of the aggregated network resources allocated by third party content servers 404 to client communications, and the actual network resources provided by ISP networks 406 to those respective client devices can be managed by integrated browsing/playback traffic server 402. Although not depicted, integrated browsing/playback traffic server 402 can further comprise billing components that store rules for allocating charges accrued by use of ISP network 406 resources, and content of third party content servers 404. These rules can establish how and to what entity the resources and content are billed, and can store charging agreements negotiated between respective ISP networks 406 and third party content servers 404, and implement billing according to such charging agreements.

Figure 5:
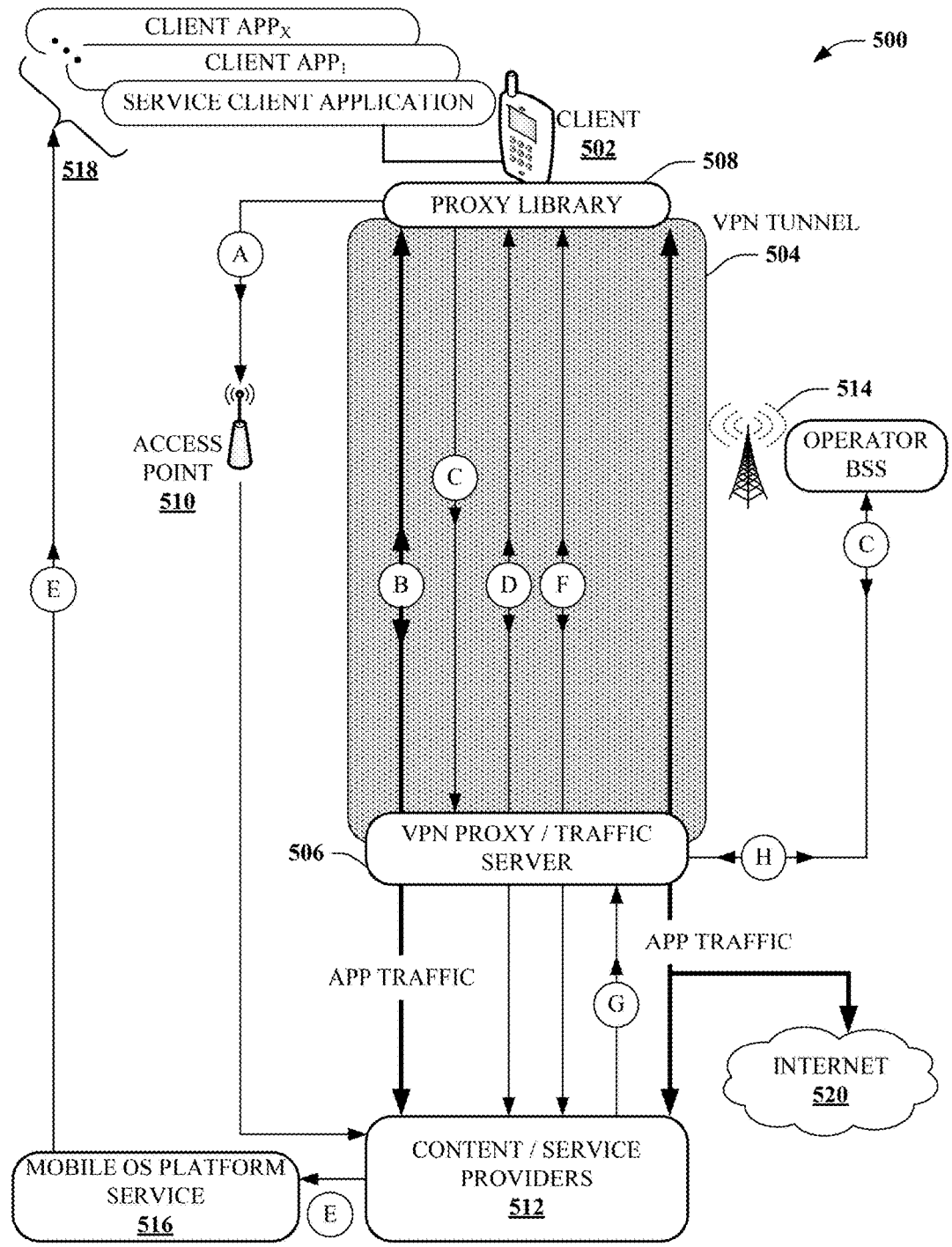
FIG. 5 depicts a block diagram of a sample system facilitating specialized content delivery for network client devices in one or more additional aspects.

FIG. 5 depicts a block diagram of an example system 500 facilitating network communications to provide online content for applications operating on a client device(s), according to one or more aspects of the subject disclosure. System 500 can comprise a client device 502 that establishes a private communication tunnel, such as a virtual private network (VPN) tunnel 504 with a VPN proxy server 506. The VPN tunnel 504 can facilitate one of a plurality of communication models (whether wired or wireless) with a content provider network 512 enabling applications of client device 502 to browse, access and receive content and services of the content provider network 512. The client device 502, VPN tunnel 504 and VPN proxy server 506 provide the basic communication framework for interconnecting client applications with online content, as is described in more detail hereinafter.

In particular aspects of the subject disclosure, system 500 can enable content provider network 512 to provide dedicated network access for client devices, providing online content or services for applications operating on the client devices. Further, the access can incorporate constraints of access network operators (e.g., "zero balance", tariffs, network resource caps, and so on). In at least one aspect, such constraints can include disparate billing models for disparate communication models (e.g., free or reduced cost for preview-only communication, tariff charges for content playback communication, etc.). To facilitate content provision to multiple client devices 502 from one or more content provider networks 512, system 500 can be configured to distinguish traffic originating from a selected application on client device 502 (e.g., a Facebook application, a Google® application, a YouTube® application, etc.) and an associated content provider network 512, while restricting other network access for non-selected applications or content from non-authorized content provider networks 512. To facilitate application-specific access to a particular content provider network 512, VPN tunnel 504 can be established (e.g., utilizing layer two tunneling protocol [L2TP]/Internet Protocol Security [IPSEC] protocol, or other suitable secure communication protocol) from a particular application 518 at client device 502 to VPN proxy/traffic server 506. VPN proxy/traffic server 506 can then open an application programming interface (API) to an associated content provider network 512 to manage access to client device 502 for the particular application 518.

In at least one aspect, system 500 can be implemented according to processes A, B, C, D, E, F, G and H as depicted, to establish a VPN tunnel 504 and provide dedicated content to an application(s) 518 of client device 502. At process A, selection of an application(s) 518 occurs at client device 502, and proxy library 508 defines a limited network access (e.g., preview-only communication model) to an access point 510 in response to the selection. Access point 510 can be a wireless access point (e.g., wireless LAN, mobile radio access network [RAN], etc.), a wired access point (e.g., T1/T3 line, coaxial cable network access, digital subscriber line [DSL] network access, . . . ), or a combination thereof. At process B, a user of client device 502 initiates service client application(s) 518 at client device. In response to activation of service client application(s) 518, proxy library 508 generates VPN tunnel 504 between client device 502 and VPN proxy/traffic server 506. For process B, the VPN tunnel 504 facilitates access only to a content service provider 512 associated with service client application(s) 518, resulting in limited application traffic being exchanged between content service provider 512 and client device 502. At process C, a user of client device 502 logs into a service at service client application(s) 518; a clientID for client device 502 is submitted for authorization by client device 502. At process D, an authorization check is performed on the client ID, and if successful, service client application(s) 518 solicits reduced cost/no cost preview-only communication model. The reduced cost/no cost preview-only communication can be forwarded to a mobile OS platform service 516, which forwards an operating system notification to application(s) 518 of client device 502. At process E, the user of client device 502 can accept or reject the offer, utilizing a subscriber account to pay for fees (if any). If accepted, service client application(s) 518 sends a tunnelID to content service provider 512. At process F the service client application(s) 518 activates Internet network resources in response to accepting the reduced fee/no cost offer, and at process G content provider network 512 requests Internet access/allocates Internet access resources for VPN tunnel 504 utilizing the tunnelID. At process H, VPN proxy/traffic server 506 opens access by tunnelID to the Internet 520 for a selected application 518. Other applications 518 other than the selected application(s) 518 can be restricted, or consume traffic at normal billing rates (per ISP or mobile carrier billing arrangements).

The aforementioned diagrams have been described with respect to interaction between several systems, apparatuses, components, user interfaces, and display indicators. It should be appreciated that such diagrams can include those components or systems specified therein, some of the specified components, or additional components. For example, a system could include Internet service network 202, client devices 204, 206, third party service provider network 302 and integrated browsing/playback traffic server 402, as one possible example. Sub-components could also be implemented as components electrically connected to other sub-components rather than included within a parent component. Additionally, it should be noted that two or more components could be combined into a single component providing aggregate functionality. For instance, resource management component 220 can comprise remote control component 212 to facilitate tracking consumption of network resources and exporting control over such network resources, by way of a single component. Components of the disclosed systems and apparatuses can also interact with one or more other components not specifically described herein but known by those of skill in the art, or made known to one of skill in the art by way of the context provided herein.

Figure 6:
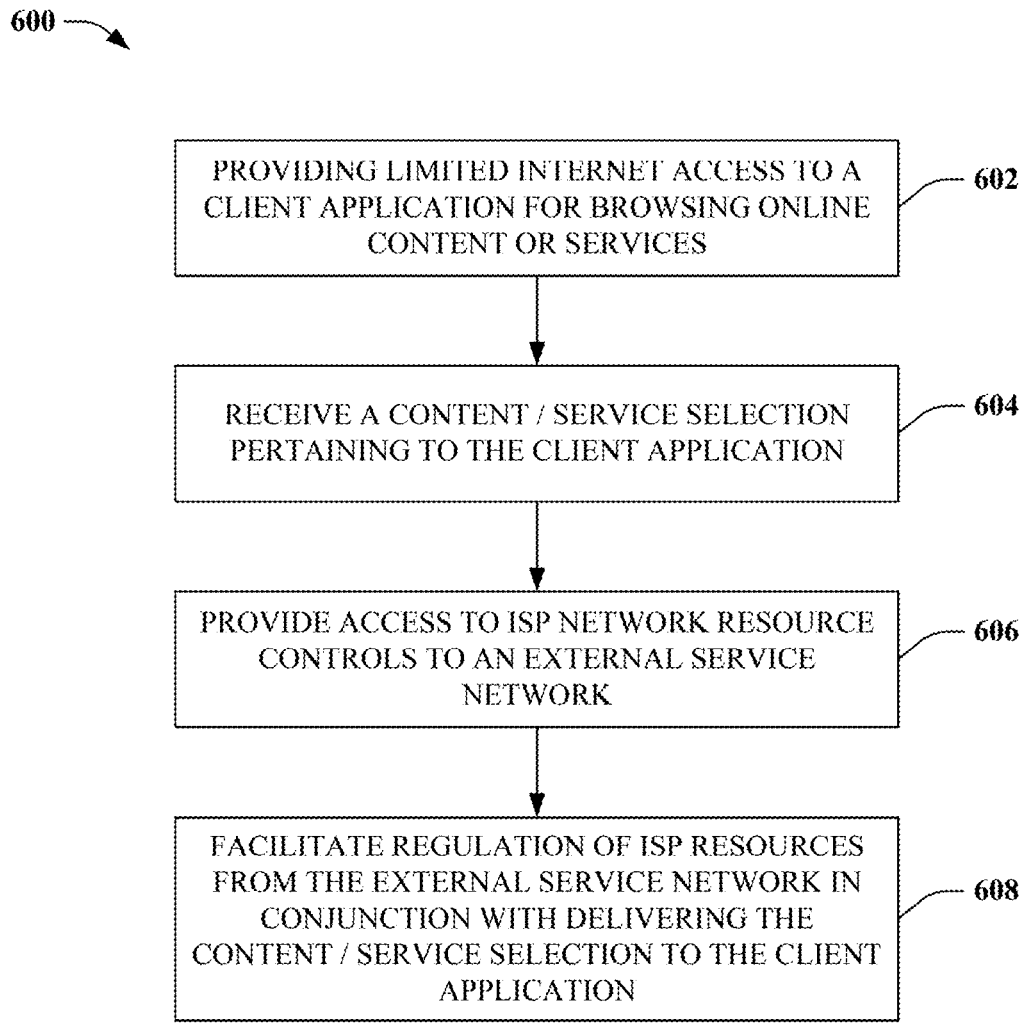
FIG. 6 depicts a flowchart of an example method for providing external allocation of network resources for client devices in a network environment.
Figure 7:
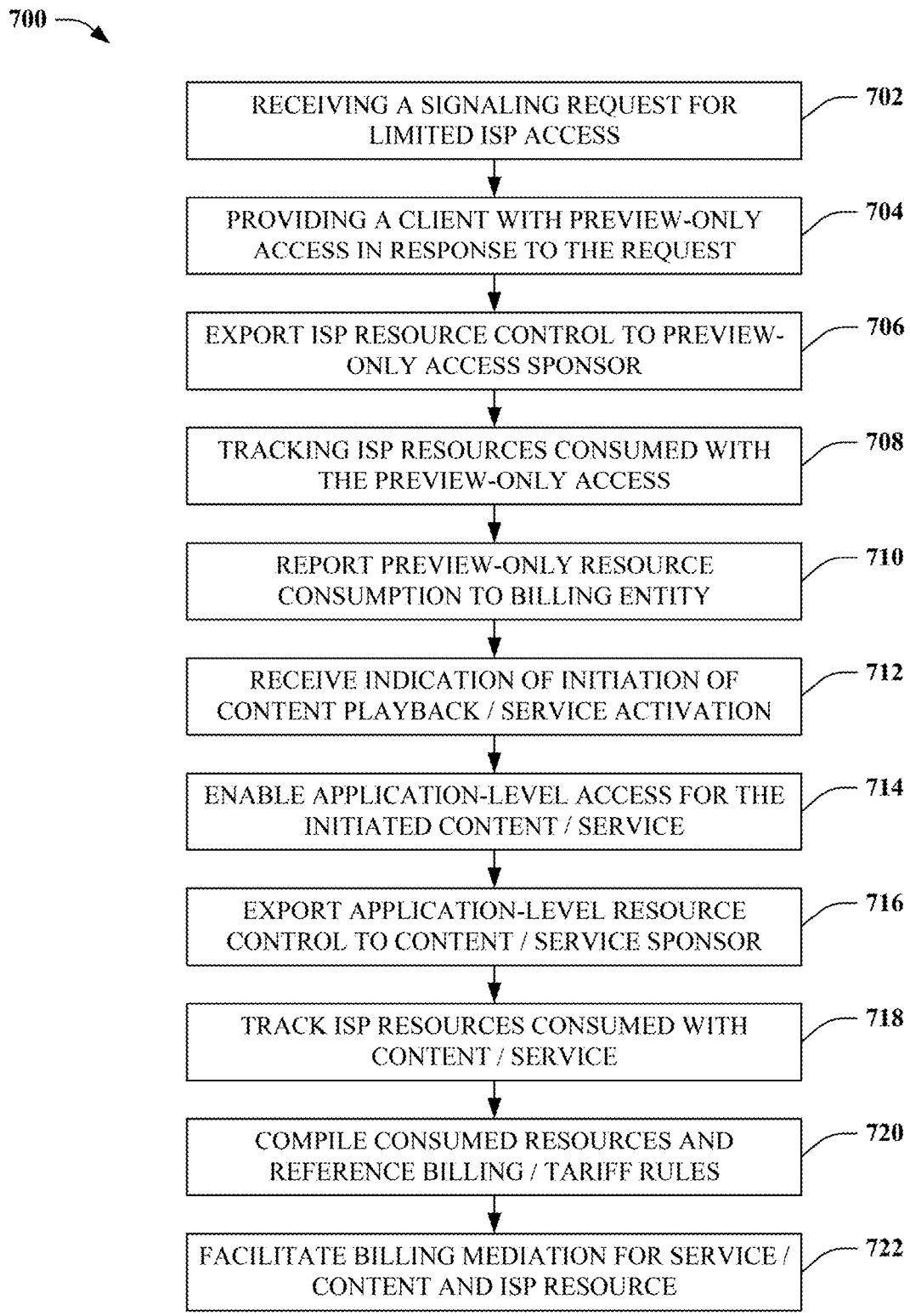
FIG. 7 depicts a flowchart of a sample method that facilitates integrated content delivery, resource allocation and billing according to at least one disclosed aspect.

In view of the exemplary diagrams described supra, process methods that may be implemented in accordance with the disclosed subject matter will be better appreciated with reference to the flow chart of FIGS. 6-7. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 6 illustrates a flowchart of a sample method 600 for facilitating external control over ISP network communication resources according to one or more aspects of the subject disclosure. At 602, method 600 can comprise providing limited Internet access to a client device or an application operating on the client device for browsing information indicative of content provided by a service provider network. The limited Internet access can, in some aspects, be application specific, in which a content browsing application (e.g., for previewing available content) on the client device can access the Internet, whereas other applications are rejected access or charged normal ISP rates. At 604, method 600 can comprise receiving indication of a selection of content pertaining to the client device. The indication can be received from the client device, in one aspect. In an alternative aspect, the indication can be forwarded from a third party content provider associated with the selected content, or with the content browsing application. At 606, method 600 can comprise providing access to ISP network resources to the service provider network. At 608, method 600 can comprise facilitating regulation of the ISP network resources from the service provider network in conjunction with delivering the content from the service provider network at least in part over the Internet to the client device. Regulation of the ISP network resources can be implemented by proxy, in one aspect, in which the service provider network submits resource allocation commands for the client device, and a component of the ISP network implements those commands. In an alternative aspect, the a communication tunnel can be established between the ISP network and the service provider network enabling direct communication between the service provider network and components of the ISP network responsible for allocating ISP network resources to the client device.

FIG. 7 depicts a flowchart of an example method 700 for providing application-based online content controlled by a content service provider according to particular aspects of the subject disclosure. At 702, method 700 can comprise receiving a signaling request for limited ISP access. At 704, method 700 can comprise providing a client device initiating the request with preview-only network access in response to the request. At 706, method 700 can comprise exporting ISP resource control to a sponsor network of the preview-only access. At 708, method 700 can comprise tracking ISP resources consumed with the preview-only access. At 710, method 700 can comprise reporting preview-only resource consumption to a billing entity. At 712, method 700 can comprise receiving an indication of initiation of content playback/service activation. At 714, method 700 can comprise enabling playback-level access for the initiated content/service. At 716, method 700 can comprise exporting playback-level resource control to a sponsor of the initiated content/service. Playback-level resource control can involve allocation of a predetermined set of network resources suitable for a type of the initiated content/service, or can involve real-time allocation of network resources in response to demand for content/data associated with the initiated content/service, or the like, or a suitable combination thereof. At 718, method 700 can comprise tracking ISP network resources consumed with the initiated content/service. At 720, method 700 can comprise compiling the consumed ISP network resources and reference billing/tariff rules for the consumed ISP network resources. At 722, method 700 can comprise facilitating billing mediation between the ISP network and the sponsor of the initiated content/service.

Figure 8:
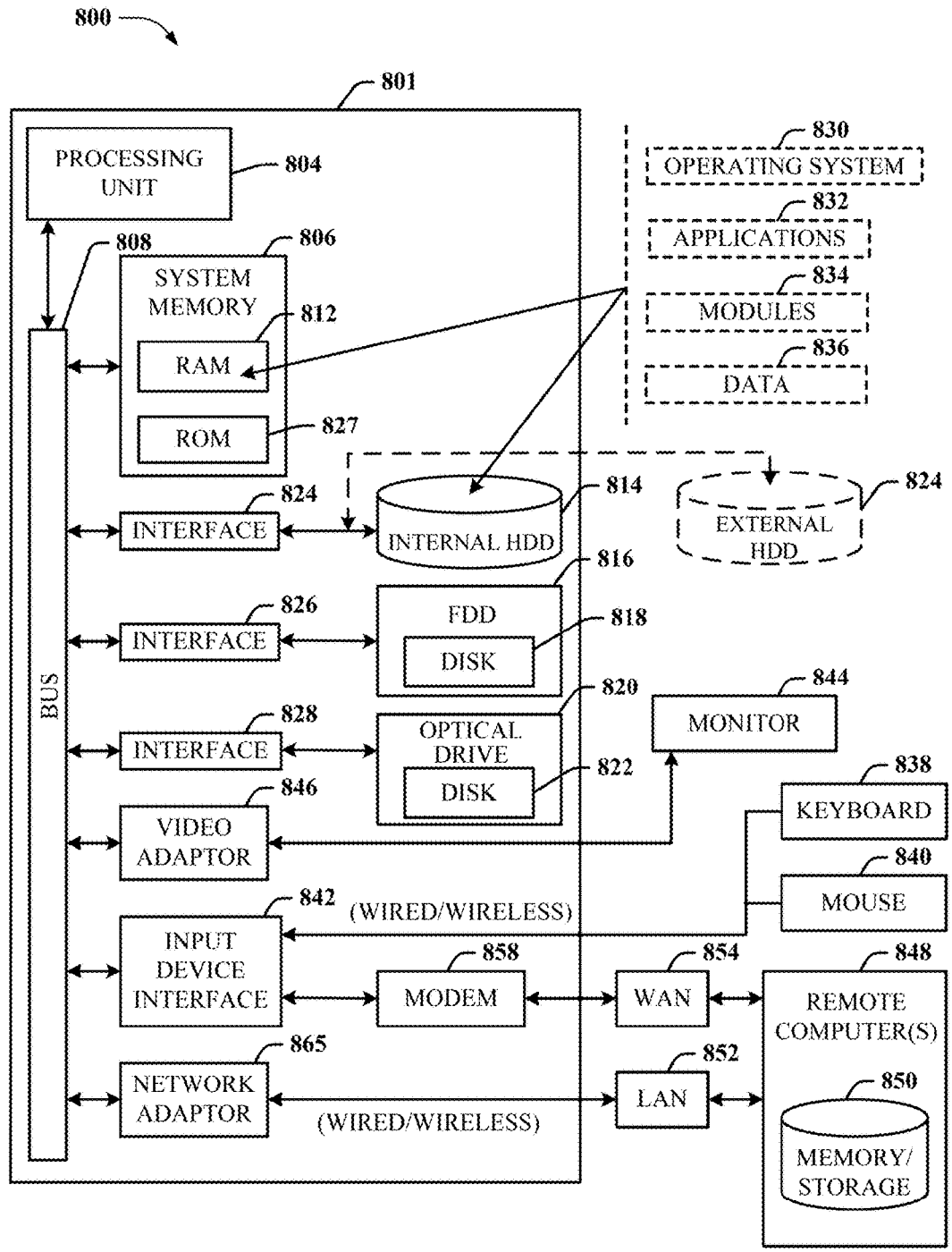
FIG. 8 illustrates a block diagram of an example electronic computing environment that can be implemented in conjunction with one or more aspects.

With reference to FIG. 8, an exemplary environment 800 for implementing various aspects described herein includes a computer 802, the computer 802 including a processing unit 804, a system memory 806 and a system bus 808. The system bus 808 connects system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that aspects of the subject disclosure can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 can operate in a networked environment using logical connections by wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or can be connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi® and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), or other bands (e.g., 802.11g, 802.11n, . . . ) so the networks can provide real-world performance similar to the basic 10BaseT wired Ethernet networks used in many offices.

Figure 9:
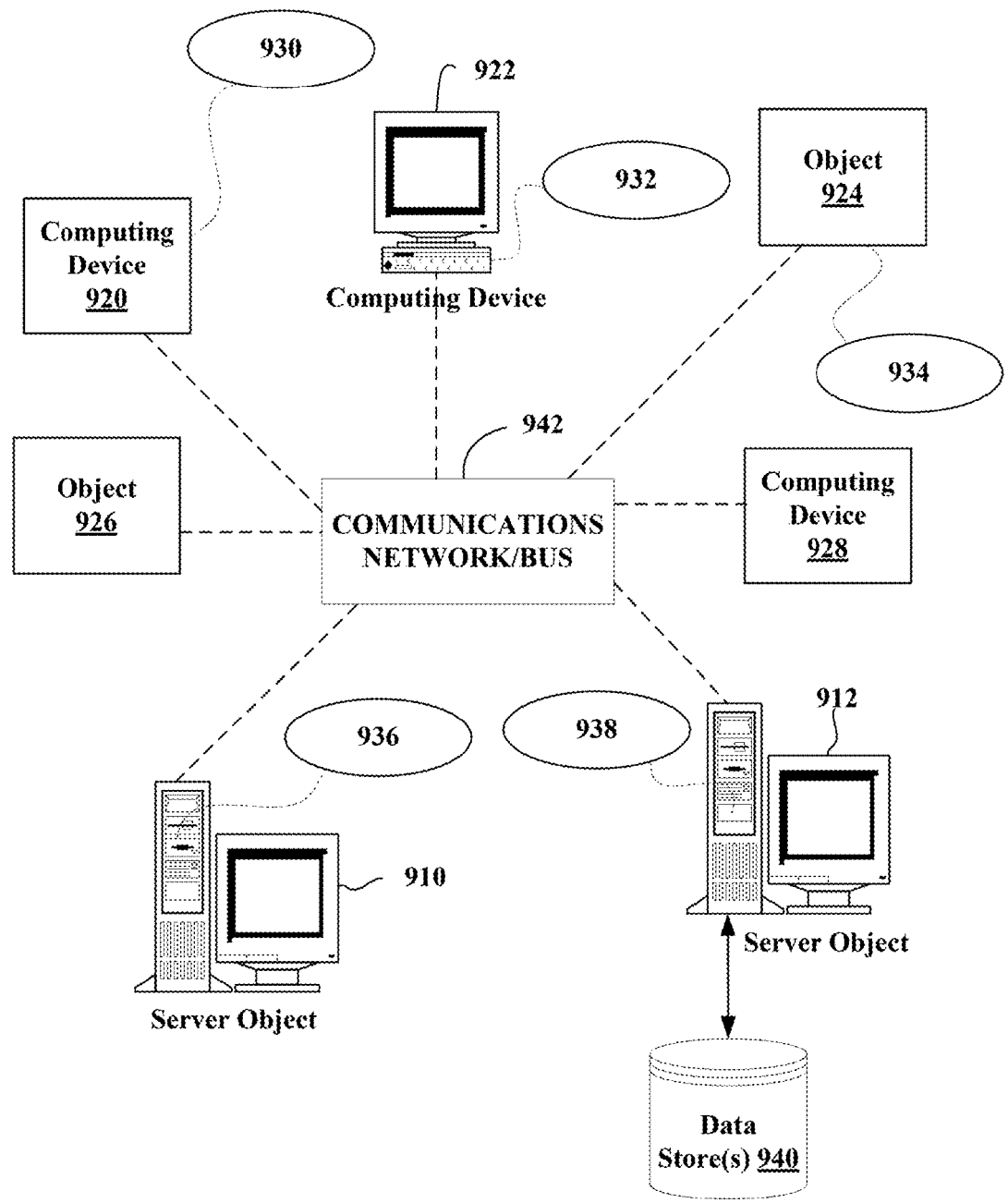
FIG. 9 depicts a block diagram of an example data communication network that can be operable in conjunction with various aspects described herein.

FIG. 9 provides a schematic diagram of an exemplary networked or distributed computing environment. The distributed computing environment comprises server objects 910, 912, etc. and computing devices or objects 920, 922, 924, 926, 928, etc., which may include programs, methods, data stores, programmable logic, etc., as represented by applications 930, 932, 934, 936, 938 and data store(s) 940. It can be appreciated that server objects 910, 912, etc. and computing devices or objects 920, 922, 924, 926, 928, etc. may comprise different devices, including data access service network 102, third party service provider network 106, client devices 104, or similar entities depicted within the illustrations, or other devices such as a network-enabled display device, network-enabled television, set-top box with network connection and display, satellite receiver and display, mobile phone, personal digital assistant (PDA), audio/video device, MP3 players, personal computer, laptop, etc. It should be further appreciated that data store(s) 940 can include data store 210, or other similar data store.

Each server object 910, 912, etc. and computing devices or objects 920, 922, 924, 926, 928, etc. can communicate with one or more other server objects 910, 912, etc. and computing devices or objects 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, or may represent multiple interconnected networks, which are not shown. Each server object 910, 912, etc. or computing device or object 920, 922, 924, 926, 928, etc. can also contain an application, such as applications 930, 932, 934, 936, 938, that might make use of an API, or other object, software, firmware or hardware, suitable for communication with or implementation of the techniques for search augmented menu and configuration functions provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. One or more of these network topologies can be employed by population of client devices 104, or client devices 204, 206 for communicating with a network. The "client" is a member of a class or group that uses the services of another class or group to which it is not related. A client can be a process, e.g., roughly a set of instructions or tasks, that requests a service provided by another program or process. The client process utilizes the requested service, in some cases without having to "know" any working details about the other program or the service itself. A client device can be a computing device or object 920, 922, 924, 926, 928 upon which a client process operates or is executed, in one or more disclosed aspects.

In a client/server architecture, particularly a networked system, a client is usually a computer that accesses shared network resources provided by another computer, e.g., a server. In the illustration of FIG. 9, as a non-limiting example, computing devices or objects 920, 922, 924, 926, 928, etc. can be thought of as clients and server objects 910, 912, etc. can be thought of as servers where server objects 910, 912, etc., acting as servers provide data services, such as receiving data from client computing devices or objects 920, 922, 924, 926, 928, etc., storing of data, processing of data, transmitting data to client computing devices or objects 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the server objects 910, 912, etc. can be Web servers with which other computing devices or objects 920, 922, 924, 926, 928, etc. communicate via any of a number of known protocols, such as the hypertext transfer protocol (HTTP). Server objects 910, 912, etc. acting as servers may also serve as clients, e.g., computing devices or objects 920, 922, 924, 926, 928, etc., as may be characteristic of a distributed computing environment.

The subject matter described herein can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" where used herein means serving as an example, instance, or illustration. For the avoidance of doubt, the subject matter disclosed herein is not limited by such examples. In addition, any aspect, embodiment or design described herein as "exemplary", "demonstrative", "illustrative", or the like, is not necessarily to be construed as preferred or advantageous over other aspects or designs, nor is it meant to preclude equivalent exemplary structures and techniques known to those of ordinary skill in the art.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
   an external gateway device configured to facilitate electronic communication with a network device of an external network;
   a client communication interface having finite communication resources and configured to facilitate communication with a population of client devices;
   a remote control component configured to facilitate allocation of a subset of the finite communication resources to the external network, wherein the subset of the finite communication resources are controlled in response to instructions received from the network device of the external network via the external gateway device; and
   a tunneling communication component configured to distinguish traffic from a selected application of a client device of the population of client devices and facilitate previewing or playback of content or services of the network device of the external network for the selected application, wherein the selected application is associated with the network device of the external network.

2. The system of claim 1, further comprising a resource management component configured to monitor and compile a record pertaining to consumption of the subset of the finite communication resources.

3. The system of claim 2, wherein the resource management component is further configured to export current metrics of the consumption of the subset of the finite communication resources to the network device of the external network via the external gateway device.

4. The system of claim 2, wherein the resource management component is further configured to parse the consumption of the subset of the finite communication resources as a function of at least one of the following criterion: identity of the external network, amount of resources consumed, type of resources consumed, or network impact caused by resources consumed.

5. The system of claim 1, further comprising a data network gateway device configured to facilitate electronic communication between the system and a data network device of a data network.

6. The system of claim 5, wherein the external gateway device comprises the data network gateway device.

7. The system of claim 5, wherein the external gateway device comprises a second set of finite communication resources configured to facilitate communication with the data network device of the data network.

8. The system of claim 7, wherein a subset of the second set of finite communication resources are configured by the remote control component to be allocated for control by the network device of the external network.

9. The system of claim 5, wherein the data network gateway device comprises a device facilitating communication between the selected application and the network device via the Internet, an intranet, a service provider network, or a public or private computer web and further facilitates excluding a second application of the client device from accessing the network device.

10. The system of claim 1, wherein the subset of the finite communication resources are configured to form a plurality of communication models.

11. The system of claim 10, wherein the plurality of communication models includes a content preview model facilitating access to a data network device of a data network or to the network device of the external network for one client device of the population of client devices for previewing the content or the services of the network device of the external network.

12. The system of claim 11, wherein a billing rate for the content preview model is at a reduced fee or no cost.

13. The system of claim 10, wherein the plurality of communication models includes a content consumption model facilitating access to a data network device of a data network or to the network device of the external network to consume the content or the services of the network device of the external network.

14. The system of claim 13, wherein a billing rate for the content consumption model incorporates a billing rate for data network services utilized to deliver the content to the one client device of the population of client devices in addition to a charge for the content delivered.

15. The system of claim 1, wherein the external gateway device is configured to integrate network resources of a plurality of Internet Service Provider networks for control by the network device of the external network via the remote control component.

16. The system of claim 1, wherein the external gateway device is configured to provision a plurality of external networks with access to control the subset of the finite communication resources via the remote control component.

17. The system of claim 1, wherein the network device of the external network is one network device of a set of network devices facilitating electronic communication with a set of networks that comprises the external network, further wherein a first network device of the set of network devices facilitates control of the allocation of the subset of the finite communication resources for one client device of the client devices by a corresponding network device of the set of network devices, and a second network device of the set of network devices facilitates delivery of the content to the one client device of the client devices, and further wherein the allocation of the subset of the finite communication resources is adapted to accommodate acquisition and playback of the content by the one client device of the client devices.

18. The system of claim 1, wherein the system is configured to aggregate network resources of a plurality of Internet Service Providers, and provide access to a subset of the network resources aggregated to a plurality of external networks including the external network, and is further configured to facilitate control by the plurality of external networks of provisioning subsets of the network resources aggregated to client devices of respective Internet Service Providers, or client devices of respective external networks.

19. A method, comprising:
providing, by a system comprising a processor, limited Internet access to a first application of a client device to content provided by a network device of a service provider network, wherein the limited Internet access is restricted from a second application of the client device;
receiving an indication of a selection of the content pertaining to the client device from the first application;
providing the first application with access to Internet Service Provider (ISP) network resources to the network device of the service provider network and restricting the access to ISP network resources to the second application; and
facilitating regulation of the ISP network resources from the network device of the service provider network in conjunction with delivering the content from the network device of the service provider network at least in part over a data network to the client device.

20. The method of claim 19, wherein the providing the limited Internet access to the first application comprises receiving a signaling system request for limited ISP access.

21. The method of claim 19, further comprising receiving an indication of a request from the client device for the limited Internet access.

22. The method of claim 21, further comprising submitting an authentication query for the limited Internet access, wherein the authentication query specifies a reduced fee or no cost billing rate for the limited Internet access.

23. The method of claim 22, further comprising charging no cost or charging the reduced fee to a subscriber account associated with the first application or with the client device in response to providing the limited Internet access.

24. The method of claim 19, further comprising submitting an authentication query for the selection of the content to first application of the client device in response to receiving the indication, wherein the authentication query specifies a content playback fee for delivery of the content.

25. The method of claim 24, further comprising charging the content playback fee to a subscriber account associated with first application or the client device in response to delivering the content to the client device.

26. A non-transitory computer readable storage medium comprising computer-executable instructions that, in response to execution, cause a system comprising a processor to perform operations, comprising:
facilitating network access for an application of a client device for content provided by a network device of a service provider network, wherein the network access restricts access to the network device for a second application of the client device;
receiving a fee-based content selection of the client device via the limited network access;

exporting control of communication resources of an access network to an external entity sponsoring the fee-based content; and facilitating allocation of the communication resources to the client device as directed by the external entity.

27. The non-transitory computer readable storage medium of claim 26, wherein the operations further comprise tracking the communication resources of the access network utilized for the network access.

28. The non-transitory computer readable storage medium of claim 27, wherein the operations further comprise reconciling costs for the communication resources among the access network and the external entity.

29. The non-transitory computer readable storage medium of claim 26, wherein the operations further comprise tracking the communication resources consumed in conjunction with delivering the fee-based content to the application of the client device.

30. The non-transitory computer readable storage medium of claim 29, wherein the operations further comprise reconciling costs for the communication resources among the access network and the external entity.

31. The non-transitory computer readable storage medium of claim 26, wherein the facilitating allocation of the communication resources further comprises submitting to the external entity real-time resource consumption and demand for network resources of the application of the client device.

32. The non-transitory computer readable storage medium of claim 26, wherein the operations further comprise implementing resource allocation commands issued by an external network at the access network.

33. The non-transitory computer readable storage medium of claim 26, wherein the operations further comprise communicatively interconnecting an external network with a resource allocation component of the access network.

34. A system for network communication, comprising:
a memory that stores executable components; and
a processor, communicatively coupled to the memory, that executes or facilitates execution of the executable components to perform operations, comprising:
facilitating network access for an application of a client device for content provided by a network device of a service provider network, wherein the network access restricts access to the network device for a second application of the client device;
receiving a fee-based content selection of the client device via the limited network access;
exporting control of communication resources of an access network to an external entity sponsoring the fee-based content; and
facilitating allocation of the communication resources to the client device as directed by the external entity.

* * * * *